Nov. 14, 1967    KIYOTA YOSHIDA ET AL    3,352,151
MECHANICAL AUTOMATIC-RECORDING APPARATUS FOR
TENSILE TESTING OF SHEET METAL
Filed July 22, 1964    4 Sheets-Sheet 1

INVENTORS
Kiyota Yoshida
Kazuo Yoshida
By Stevens, Davis, Miller & Mosher
Attorneys

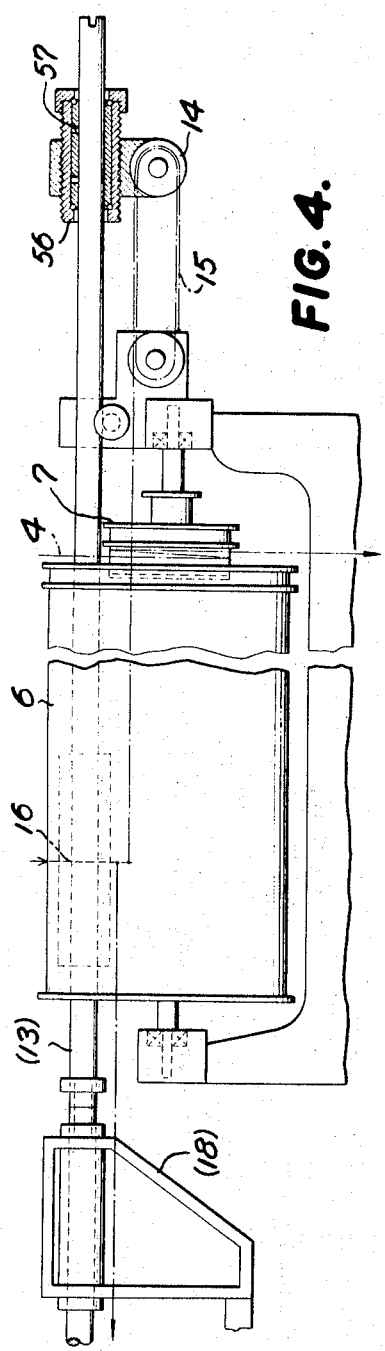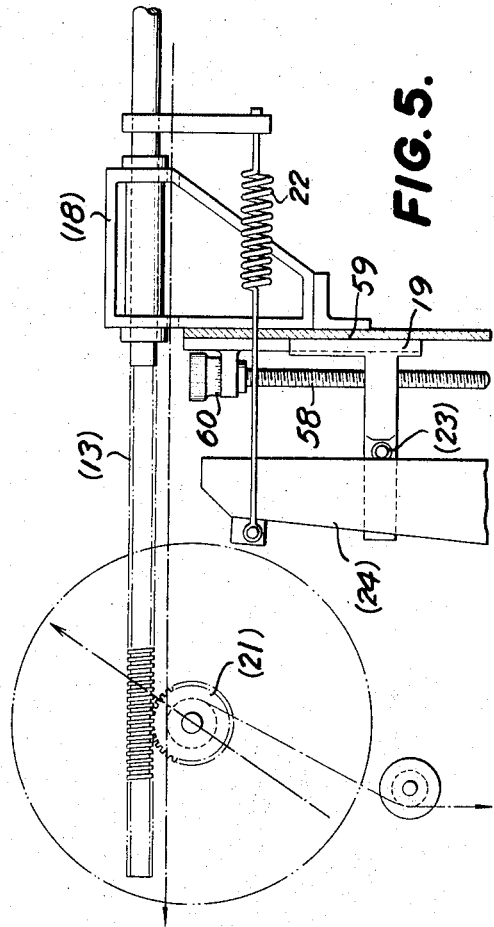

United States Patent Office 3,352,151
Patented Nov. 14, 1967

3,352,151
MECHANICAL AUTOMATIC-RECORDING APPARATUS FOR TENSILE TESTING OF SHEET METAL
Kiyota Yoshida, Suwa-machi, Tokyo, and Kazuo Yoshida, Narashino-shi, Chiba-ken, Japan, assignors to Rikagaku Kenkyusho, Bunkyo-ku, Japan, and Kawasaki Seitetsu Kabushiki Kaisha, both corporations of Japan
Filed July 22, 1964, Ser. No. 384,488
Claims priority, application Japan, July 31, 1963, 38/37,955; Sept. 28, 1963, 38/51,624, 38/51,625, 38/72,733
4 Claims. (Cl. 73—89)

The present invention relates to a precise mechanical automatic-recording apparatus for tensile testing of sheet metal, more particularly to a precise mechanical automatic-recording apparatus adapted to be mounted on an existing material testing apparatus of pendulum type and comprising an elongation magnifying device, a width contraction magnifying device, a load magnifying and recording device, a means for regulating the magnifying ratio of the indicated load, and sheets of special recording papers and $r$-value reading charts in order to readily obtain basic characteristic values of the sheet metal.

Mechanical characteristics of materials determined by a tensile testing will constitute not only a basic element of the mechanical analysis in a plastic working, but also play an important part in estimating various formabilities of sheet material qualitatively and quantitatively. For this reason, a value measured by a tensile testing is used as a standard of merchandizing and usage.

Also, a ratio of width strain $\lambda w$ to thickness strain $\lambda t$ of sheet metal, or a plastic strain ratio ($r$-value) has recently been considered an important factor as a characteristic showing a deep drawability of the sheet metal. A term "plastic strain ratio ($r$-value)" is understood to mean a ratio of logarithmic strains, that is, $$\epsilon_w = \log_e (1+\lambda_w) \text{ to } \epsilon_t = \log_e (1+\lambda_t)$$

which is expressed by a following formula:

$$r\text{-value} = \epsilon_w/\epsilon_t = \log_e (1+\lambda_w)/\log_e (1+\lambda_t) = \epsilon_w/(\epsilon_l - \epsilon_w)$$

Where $$\epsilon_l + \epsilon_w + \epsilon_t = 0$$

logarithmic strain in length $$\epsilon_l = \log_e (1+\lambda_l)$$

Under such circumstances, it is strongly desired to obtain those necessary characteristic values easily, accurately and, in as many forms as possible. However, there has been no adequate automatic-recording apparatus for measuring those strains, particularly a width contraction to a properly magnified scale until now, except by an electrical determining means which is used only for measuring an elongation and is disadvantageous in terms of recording speed, accuracy and adjustment, thus resulting in an unsatisfactory operation.

According to the present invention, it is rendered possible to measure and magnify not only a conventional elongation but also a width contraction and a load by a purely mechanical means and to record a load vs. elongation curve and an elongation vs. width contraction curve continuously and automatically at the same time.

A primary object of the present invention is to continuously measure and magnify a width contraction as well as an elongation of the test specimen at the time of tensile testing, thus rendering it possible to determine the $r$-value of any sheet metal which is very important for estimating the deep drawability of sheet metal as described hereinbefore.

Another object of the present invention is to reduce an error involved in the load-elongation curve and elongation-width contraction curve by measuring an elongation accurately between two gauge marks, particularly by eliminating extraneous effect such as an elongation outside the gauge length and a slip in way of chucks.

Still another object of the present invention is to magnify a value of elongation and width contraction and hence a load-elongation curve and elongation-width contraction curve of the test specimen so as to make it easy and accurate to read above-mentioned curves.

One preferable embodiment of the present invention will be hereinafter described in detail by way of an example with reference to the accompanying drawings, in which:

FIG. 3b is a horizontal section view taken along a line III$_b$—III$_b$ in FIG. 3a;

FIG. 3c is a side elevation view showing the device of FIG. 3a;

FIG. 4 is a front elevation view showing a load magnifying and recording device according to the present invention; and FIG. 5 is a front elevation view to an enlarged scale showing a device for regulating a magnifying ratio of the indicated load.

Figure 1:
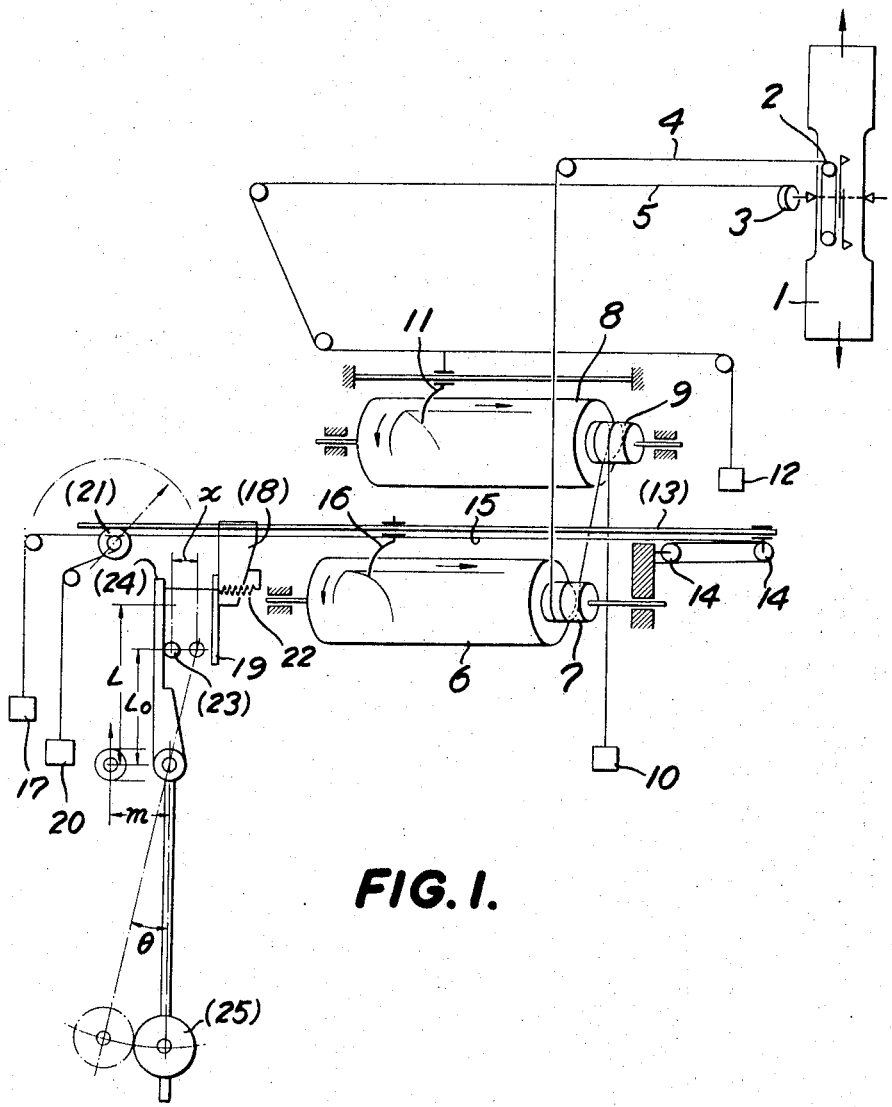
FIG. 1 is a schematical perspective view showing a mechanical automatic-recording apparatus provided with an elongation and width contraction magnifying device respectively mounted on an Amsler testing machine of pendulum type.
Figure 2A:
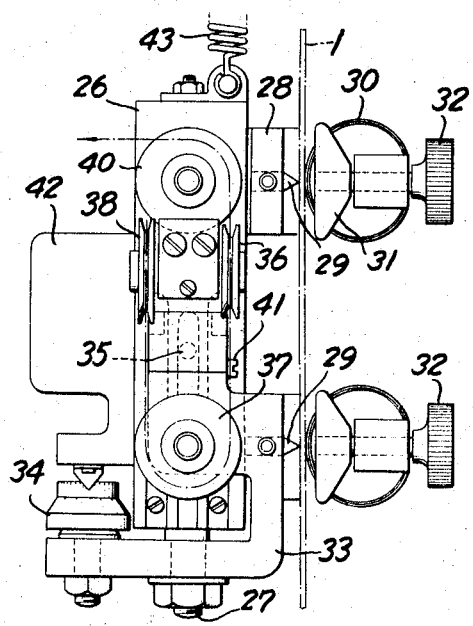
FIG. 2a is a side elevation view showing an elongation measuring and magnifying device according to the present invention.
Figure 2B:
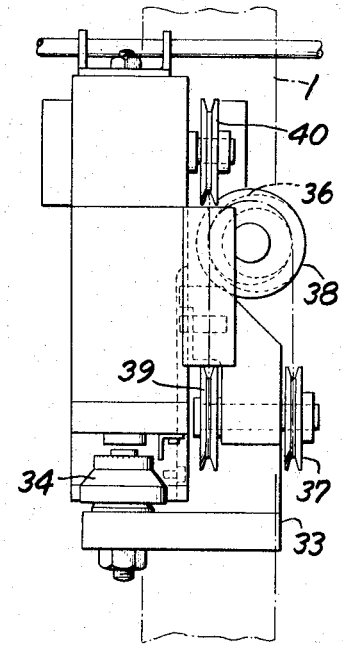
FIG. 2b is a rear elevation view showing the same.
Figure 2D:
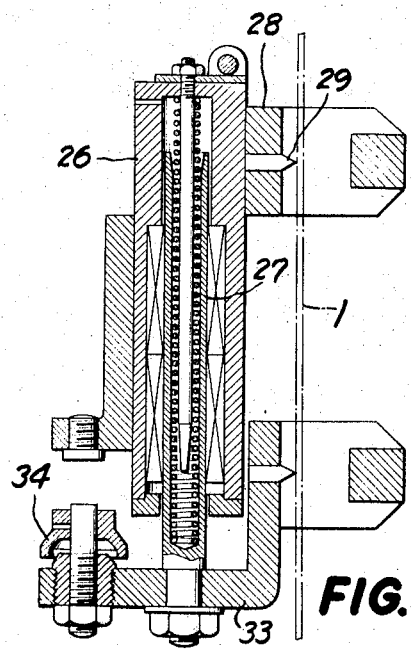
FIG. 2d is a longitudinal section view taken along a line A—A in FIG. 2c.
Figure 2C:
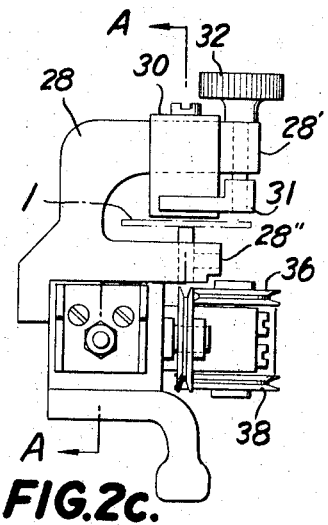
FIG. 2c is a plan view showing the same.

With reference to FIG. 1 of the accompanying drawings in which the same reference numerals are used to indicate like or corresponding parts or elements throughout, a general arrangement of the tensile testing machine provided with an apparatus according to the present invention, with each member of said apparatus being illustrated in a mounted condition.

The reference numeral 1 designates a specimen for tensile testing such as a Japanese Industrial Standards (JIS) No. 5 specimen having a length of 60 mm. and a width of 25 mm. in way of parallel part, 2 an elongation magnifying device, a transmitting string 4 which is led out as shown after magnifying an elongation five times, 3 a width contraction magnifying device, a transmitting string 5 which is led out as shown after magnifying a width contraction twenty times. Both strings 4 and 5 are extended in a horizontal direction approximately one meter and hence a measured amount will not be affected by a slight downward movement of devices 2 and 3 caused by an elongation of the tensile specimen. A variation of the distance between two gauge marks of the specimen will be directly measured by the present means.

By 6 is designated a recording drum preferably having a diameter 90 mm. and a length 230 mm., 7 a winding drum of 45 mm. diameter (strictly speaking, a diameter measured between centres of two strings wound therearound) which drum is connected with drum 6 by a friction clutch. Both drums 6 and 7 are intended for recording an elongation vs. load curve. Drums 8 and 9 have a same size as that of said drums 6 and 7, respectively, and are intended for recording an elongation vs. width contraction curve. Both drums 6 and 8 (hence 7 and 9) may be combined together to take two records simultaneously on a single drum. By 10 is designated a weight for the transmitting string, 11 a pen for recording the width contraction, 12 a weight for the width contraction transmitting string.

By (13) is designated an existing transmitting rod for indicating a load of the testing machine. A plurality of sheaves 14, a magnifying string 15, a recording pen 16, and a weight 17 are connected to said rod (13) to magnify the load reading. Any reference numeral in parentheses, for instance (13), will denote an existing part of the testing machine in this specification and the accompanying drawings.

By 19 is designated a means for regulating the magnifying ratio of the load mounted on an existing bracket (18) which is adapted to change only a magnifying ratio in conjunction with a weight 20, a differential sheave (21) and a spring 22 without any effect on a load characteristic of the existing testing machine as will be described more in detail hereinafter. By (23) is designated a roller located at a contact point, (24) a pushing lever and (25) a pendulum.

The recording drums have been shown mounted on an existing testing machine, but some of the parts such as a drum and a recording pen may be located separately from the existing testing machine and connected thereto by means of a string.

An elongation measuring and magnifying device will now be described with reference to FIGS. 2a, 2b, 2c and 2d. The main part comprises a cylindrical case 26 and a ram 27 which is freely slidable within said case 26 through a special ball bearing. A spring is inserted within a ram and will urge said ram outward with a uniform pressure and counterbalance with a tension of the string. A fitting 28 for securing said device 2 on a specimen is mounted on said case 26 in the upper part thereof by means of four pieces of machine screws. Several extra holes for the machine screws are provided on said case 26 at a spacing of five millimeters to enable to adjacent the position of said fitting 28 for setting a spacing of knife edges 29 in a range of 25–60 mm. corresponding to a desired reference distance or gauge length of the specimen. Accordingly, it is not necessary to punch any gauge mark particularly on a specimen. A spacing between both knife edges is accurately equal to a gauge length of the specimen when said case 26 and said ram 27 are closely held in contact with each other. A knife edge 29 is inserted into said fitting 28 and will be interchanged easily. A U-shaped fitting 28 will hold a specimen 1 between its two legs 28' and 28'' and is provided with an annular spring 30 at the end thereof, which spring will urge a specimen against the knife edge to prevent it from slipping. Two pieces of finger-shaped fittings 31 are provided on said fitting 28 to hold back said annular spring 30 into an oval configuration and are operated by a hand grip 32. A ram 27 is provided with a lower fitting 33 for securing the device 2 on a specimen adjacent the lower end thereof which fitting is in turn provided with a knife edge and an annular spring in the same manner as the upper one. The device 2 will come in contact with a specimen at both gauge marks by means of an upper and lower knife edge and the fitting 33 will move in accordance with an elongation of the specimen. The fitting 33 is provided with a micrometer 34, which will determine a minimum distance between the case 26 and the fitting 33, that is, a gauge length between the upper and lower knife edge. This micrometer can be used for finding out an elongation corresponding to the standard gauge length by adjusting the gauge mark beforehand in case there is a slight error in the record of the magnifying device. The accuracy of the recording device can be checked occasionally by inserting a gauge block, such as 10 mm., 20 mm. size, into a gap of the micrometer during the operation of tensile testing. A small roller 35 provided on the fitting 33 will slide along the case 26 in its side, and will prevent relative rotation between the case 26 and the fitting 33. Each of the sheaves 36, 37, 38, 39 and 40 is mounted on said case 26 and said fitting 33, and a string is run about each sheave in the order described above, in a direction parallel with the axis of the device. The string is on the fitting 33 at one end thereof by means of a machine screw 41. The string which is led through a group of said sheaves will move in a horizontal direction five times the variation of the distance between the upper and lower knife edge. A fitting 42 serves as a grip for handling the device 2 at the time of mounting or removing. By 43 is designated a suspending spring designed to hold the magnifying device 2 in a constant position by counterbalancing with the weight of the same. The string thus taken out will actuate said drums 6 and 7 and is pulled by a weight 10 of one hundred grams. There may be some extra compressive force (approximately 500 g.) acting between the upper and lower knife edge beside the normal testing load, but said compressive force will be offset by a spring provided in said ram 27 and an extraneous compression is maintained approximately at ±150 g.

Figure 3A:
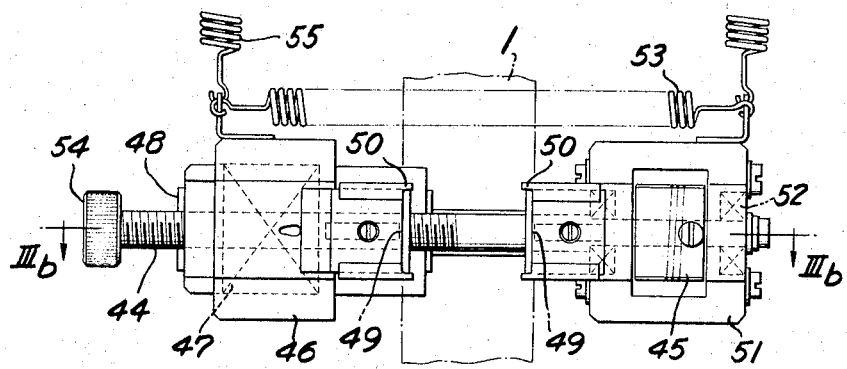
FIG. 3a is a rear elevational view showing a width contraction measuring and magnifying device according to the present invention.
Figure 3B:
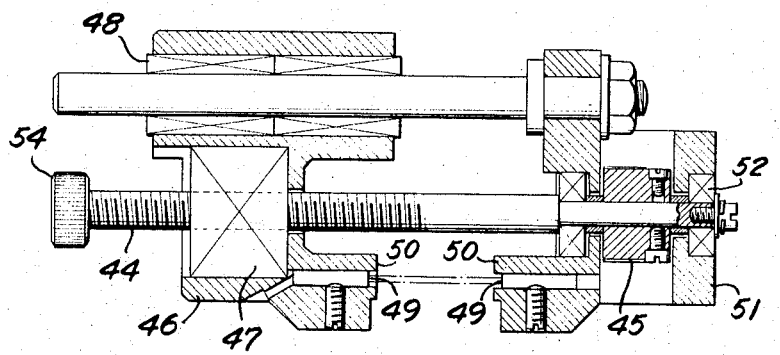
Figure 3C:
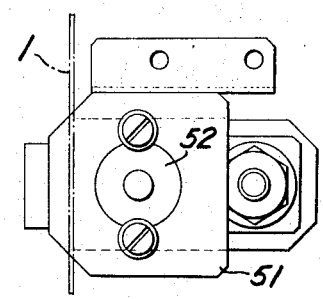

The width contraction measuring and magnifying device will now be described with reference to FIGS. 3a, 3b, 3c. In the prior art, a predetermined elongation has been produced in a specimen for the tensile testing and then a variation of thickness and width has been measured by a micrometer in order to work out an r-value, or an elongation has been determined by some measuring device and the r-value was worked out by a computation using said value of the elongation and a width strain of the specimen. Such a process is troublesome and moreover it is very hard to obtain the r-value continuously. Briefly summarized, the present device is a type of micrometer, which tends to close constantly by an action of a string pulled by a weight, that is, tends to follow a width contraction at all time. A variation of width will be continuously taken out by means of a string, which is adapted to act simultaneously with said elongation recording means. The main part of the device comprises a precise ball bearing screw rod 44 which rotates very smoothly, and a winding drum 45 for the string. A case 46 is provided with a female nut 47 and a slide bearing 48. Both parts, which will come in contact with the side edge of the specimen, are respectively provided with contact pieces 49 and guide 50 which hold a specimen between themselves. A case 51 is provided with a string winding drum 45 and a bearing 52. An auxiliary spring 53 will facilitate a mounting operation of the device. A grip 54 is also intended for mounting the device on a specimen. A suspension spring 55 is designed just for preventing the device from falling down and will keep it in a constant fixed position by balancing its approximate weight. A string thus taken out will move twenty times the width contraction through a magnifying action caused by a relation of the thread pitch of the ball bearing screw rod 44 and the diameter of the winding drum, and will thus actuate a recording pen 11 for width contraction. The string is pulled by a weight 12.

The load magnifying and recording device will now be described with reference to FIGS. 1 and 4. In an existing material testing machine, a load is recorded in most cases in such a manner as to move a recording pen 100 mm. while a dial hand makes one revolution, that is, a full scale. However, this scale of the record is too small and hence is preferably enlarged. In the present embodiment, a recording drum portion of the existing testing machine is modified and an existing transmitting rod (13) for indicating a load has been utilized as a guide for the load recording pen 16 which is slidably supported on said guide. The recording drum and pen may be located separately from said testing machine. A sheave support 56 (FIG. 4) is secured on said transmitting rod (13) by means of set screws 57. A string 15 may be run around a group of those sheaves 14 doubly or quadruply dependent upon a desired magnifying ratio of the load. A pressure on a pusher lever (24) exerted by a contact roller (23) will be made approximately zero by adjusting the weights 17 and 20 as shown in FIG. 1. In addition, a spring 22 is provided as an auxiliary means to assure the contact of said roller (23) with said pusher lever (24) and an increase of the contact pressure by said spring 22 will not involve any substantial error. A load recording pen 16 is actuated by a string 15.

A device for regulating the magnifying rate of the indicated load shown in FIGS. 1 and 5 will now be described. A hand of the load indicator and a recording system will move in proportion to a deviation of moment of the pendulum in an Amsler pendulum type testing machine. Hence, if a cross sectional area of the specimen is exactly constant at all time, a nominal stress will be obtained only by changing a graduation of the indicated load. But actually, a size of the specimen varies in width and in thickness. The specimens having a width of 25 mm. and thickness of 0.8–1.2 mm. are most frequently tested in case of sheet metal, wherein a specimen JIS— No. 5 having a width of 25 mm. and a length of 60 mm. in way of the parallel part will be used. Hence, the sectional area may be divided into several kinds. For instance, if we assume three kinds of standard thickness 0.8, 1.0, 1.2 mm. and ±15% of variation in sectional area for each of three standard sectional area 20 mm.$^2$, 25 mm.$^2$, and 30 mm.$^2$, plate thickness will fall in a range 0.7–1.4 mm. as a whole. Since a nominal stress is a load divided by the initial cross sectional area, a nominal stress instead of a load will be directly obtained by making the load indication vary reversely to the cross sectional area in case the cross sectional area varies in a range of 15%. Actually, a contact point of the pusher lever which is actuating a transmitting rod for the load indicator may be regulated and set corresponding to a ratio of the cross sectional area ($A_0/A$=standard sectional area/sectional area of actuating specimen). This relation is shown in a formula $L/L_0=A_0/A$, where $L_0$ is a distance from a pivot point of the pendulum to a standard position of the contact roller and L a distance from a pivot point of the same pendulum to a regulated position of the same roller. When said contact point is varied, there may be some error in the load reading because of the variation of the moment which is exerted by a pusher lever. In order to avoid this error, any horizontal force acting on a contact roller should be made zero by the weights 17 and 20 as described hereinbefore and a required contact pressure on said roller should be exerted by a spring 22 to correct a zero point of the testing machine. A regulating device 19 is mounted on a bracket (18) of the transmitting rod as shown in FIG. 5, is adapted to move along a guide by a feed screw 58 and is provided with a regular scale 59 and a vernier scale 60 which are graduated by $L/L_0(=A_0/A)$. The contact roller (23) will come in contact with said pusher lever (24) by an action of the spring 22.

A curve of nominal stress vs. elongation will be recorded by said load magnifying and recording device and by a device for regulating the magnifying rate of the indicated load. If a nominal stress is designated by $s_0$, actual stress s, strain in length $\lambda_1$, then $$s=s_0(1+\lambda_1)$$

can be worked out by above relation. An actual stress can be read directly by a graduation of the reducing curves. If a logarithmic strain in length is designated by $\epsilon_1$, then $$\epsilon_1=\log(1+\lambda_1)$$

can be worked out by above formula.

A logarithmic strain can be read out directly, if the paper is graduated by a logarithmic strain. A coefficient of work hardening, $n$-value, which is defined by a relation $$s=Ce^n$$

can be easily worked out from said actual stress vs. logarithmic strain curve, that is a stress-strain curve.

As described clearly hereinabove, the present invention is characterized in that a device for magnifying the elongation and the width contraction respectively comprises a set of very simple tackle as a principle, a string for each of said devices is led out horizontally in an unique manner as to steady the determined value, a device for magnifying the indicated load comprises a set of similar simple tackle, a device for regulating the magnifying ratio of the indicated load comprises a screw rod and lever mechanism, all above devices can be mounted readily on an ordinary Amsler pendulum type tensile testing machine, a curve for each of elongation vs. load and elongation vs. width contraction is recorded automatically and synchronizingly and special recording papers are provided to thereby simplify the computation of the characteristic value. As a result, a device according to the present invention is easy to handle in measuring various characteristic values at the time of tensile testing, reliable for the long period of time and enables to determine those values accurately and rapidly. The special coefficients such as a coefficient of work hardening ($n$-value) and a plastic strain ratio ($r$-value) can be very easily worked out in conjunction with the particular recording papers thus rendering it useful for a wide range of usage.

The present invention has been described in connection with a particular structural embodiment which has proven satisfactory in use; however, it is appreciated that the structural embodiment may be modified without departing from the intended spirit and scope of the present invention as defined in the appended claims.

What is claimed is:

1. A specimen elongation magnifying device suitable for use in a tensile testing machine, the device comprising two members, one mounted with respect of the other so as to be movable relative to the other, coupling means for coupling the members to respective opposite ends of a gage length of a specimen to be tested so that any change in the distance between said ends will cause a corresponding movement of said one member relative to the other, pulleys carried by the members, a flexible elongated connecting member disposed on said pulleys and having a portion extending away from the pulleys so that any movement of said one member with respect to the other will cause a corresponding but magnified movement of said portion of the connecting member, and spring means acting between said two members to oppose the force that would be extraneously applied on the test specimen by the tension of said connecting member.

2. A specimen width contraction magnifying device, for mounting directly on a specimen to be tested in tension, the device comprising two contact members between which a specimen is to be directly gripped crosswise, one of said members being mounted with respect to the other for movement towards and away from the other of said members, a threaded member mounted with respect to the contact members so as to be rotated in one direction when the contact members move apart and in the other direction when the members are moved towards each other in response to variance in the width of said specimen, a winding drum fixed to said threaded member and adapted to be rotated in response to rotation of the threaded member, an elongated flexible member wound about said drum and having a portion extending away from the drum so that relative movement between said contact members will cause a corresponding but magnified movement of said portion of the flexible member, and a guide bar member fixedly mounted on one of said two contact members so as to slidably guide the other of the same.

3. A load value magnifying device for mounting on a testing machine comprising a displaceable load value transmitting member the displacement of which is proportional to the load applied by the machine to a test specimen, first pulley means held stationary with respect to the machine, second pulley means which will move towards and away from the first pulley means with the movement of the transmitting member in one direction and the opposite direction respectively, an elongated flexible member one end of which is held stationary with respect to the machine, one portion of said flexible member extending over said first and second pulley means and another portion of said flexible member extending away from said first and second pulley means while driving a load indicating device such as an input for a recorder so that, on movement of the transmitting member, there will be a corresponding but magnified movement of said other portion of the flexible member, and means applying to said other portion of the flexible member a force directed away from the pulley means.

4. A load indicator for a pendulum type testing machine comprising a pendulum for balancing the applied load of the machine, a displaceable load indicating member, support means fixed to said load indicating member, and a contact member mounted on said support means, said pendulum adapted to engage the contact member to displace the load indicating member by an amount proportional to the applied load, the position of said contact member relative to said support means being adjustable in the longitudinal direction of said pendulum to vary the effective length of said pendulum and thus the amount of displacement of the load indicating member for a given applied load.

References Cited

UNITED STATES PATENTS

| | | | |
|---|---|---|---|
| 869,716 | 10/1907 | Kenerson | 73—88 |
| 1,679,751 | 8/1928 | Stevenson | 73—98 |
| 1,906,340 | 5/1933 | Scott | 73—95 |
| 2,014,357 | 9/1935 | Klemperer | 73—89 |
| 2,562,749 | 7/1951 | Speer | 73—95 |
| 2,601,130 | 6/1952 | Scott et al. | 73—98 |

FOREIGN PATENTS 122,307  1/1919  Great Britain.

RICHARD C. QUEISSER, *Primary Examiner.*

JAMES GILL, *Examiner.*

JAMES H. WILLIAMSON, *Assistant Examiner.*